United States Patent
Tanaka et al.

(10) Patent No.: US 9,669,694 B2
(45) Date of Patent: Jun. 6, 2017

(54) VEHICLE

(71) Applicant: YAMAHA HATSUDOKI KABUSHIKI KAISHA, Iwata-shi, Shizuoka (JP)

(72) Inventors: Daisuke Tanaka, Shizuoka (JP); Masahiro Yoshida, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 10 days.

(21) Appl. No.: 14/941,848

(22) Filed: Nov. 16, 2015

(65) Prior Publication Data

US 2016/0152126 A1 Jun. 2, 2016

(30) Foreign Application Priority Data

Nov. 28, 2014 (JP) ................. 2014-242314

(51) Int. Cl.
| | |
|---|---|
| *B60K 5/02* | (2006.01) |
| *F16H 63/08* | (2006.01) |
| *B60K 17/06* | (2006.01) |
| *B60K 20/02* | (2006.01) |
| *B60N 2/005* | (2006.01) |
| *F16D 25/12* | (2006.01) |
| *B60K 17/08* | (2006.01) |
| *F16H 3/089* | (2006.01) |
| *B60K 17/02* | (2006.01) |
| *B60K 5/00* | (2006.01) |

(52) U.S. Cl.
CPC ............ *B60K 5/02* (2013.01); *B60K 17/06* (2013.01); *B60K 17/08* (2013.01); *B60K 20/02* (2013.01); *B60N 2/005* (2013.01); *F16D 25/123* (2013.01); *F16H 63/08* (2013.01); *B60K 17/02* (2013.01); *B60K 2005/003* (2013.01); *B60Y 2200/20* (2013.01); *F16H 3/089* (2013.01)

(58) Field of Classification Search
CPC .......... B60K 5/02; B60K 17/00; B60K 17/02; B60K 2005/003; B60N 2/005; B60Y 2200/20
See application file for complete search history.

(56) References Cited

U.S. PATENT DOCUMENTS

| | | | |
|---|---|---|---|
| 5,967,252 A | 10/1999 | Saban et al. | |
| 6,257,081 B1 * | 7/2001 | Gagnon | B60W 10/02 477/63 |
| 6,296,073 B1 * | 10/2001 | Rioux | B60K 5/02 180/233 |
| 6,443,275 B1 | 9/2002 | Hori et al. | |
| 2002/0003058 A1 * | 1/2002 | Hori | B60K 17/00 180/248 |
| 2014/0083228 A1 * | 3/2014 | Mitsubori | F16H 63/18 74/473.36 |

(Continued)

*Primary Examiner* — Brian Swenson
(74) *Attorney, Agent, or Firm* — Keating and Bennett, LLP

(57) ABSTRACT

A vehicle includes a body frame, an engine, a transmission, a transmission case, and a shift actuator. The engine includes an engine case attached to the body frame, and a crankshaft supported by the engine case. The transmission case is spaced apart from the engine case, and houses the transmission. The shift actuator is connected to a shift drum of the transmission. At least a portion of the transmission case overlaps with the engine case as viewed along the axis of the crankshaft. The shift actuator is fixed to the transmission case.

18 Claims, 10 Drawing Sheets

(56) References Cited

U.S. PATENT DOCUMENTS

| | | | |
|---|---|---|---|
| 2014/0174397 A1* | 6/2014 | Kisaichi | F02F 7/0043 123/195 R |
| 2015/0090062 A1* | 4/2015 | Norita | F16H 63/18 74/473.37 |
| 2015/0210163 A1* | 7/2015 | Murakawa | B60K 17/28 180/292 |

\* cited by examiner

VEHICLE

This application claims priority to Patent Application No. 2014-242314 filed in Japan on Nov. 28, 2014, the entire contents of which are hereby incorporated by reference.

BACKGROUND OF THE INVENTION

1. Field of the Invention

The present invention relates to vehicles suitable for traveling over rough terrain.

2. Description of the Related Art

Vehicles suitable for traveling over rough terrain are conventionally known. Among such vehicles are an all-terrain vehicle (hereinafter referred to as an "ATV") and a recreational off-highway vehicle (hereinafter referred to as an "ROV"). Although some ATVs and ROVs include continuously variable transmissions (CVTs), it is desirable to develop ATVs and ROVs including traditional transmissions with the aim of further improving durability, for example.

For example, U.S. Pat. No. 6,443,275 and U.S. Pat. No. 6,257,081 each discloses an ATV including an automated manual transmission (AMT). Such an ATV includes an engine integral with a transmission case housing the transmission. A shift actuator and a clutch actuator are directly attached to the engine integral with the transmission case. U.S. Pat. No. 5,967,252 discloses a vehicle including an engine integral with a mechanical transmission, and a shift actuator fixed to a forward portion of a body frame so as to aid in shifting gears with a shift pedal. This vehicle allows the shift actuator to operate a link connected with the shift pedal, thus performing a gear shifting function.

Unfortunately, a vehicle such as an ATV or ROV requires that an engine and a transmission be disposed in a limited space inward of a body frame. In particular, the space in which to dispose a large engine integral with a transmission is severely limited, which significantly reduces layout flexibility. In the ATV disclosed in each of U.S. Pat. No. 6,443,275 and U.S. Pat. No. 6,257,081, the engine and the transmission case are integral with each other, and the shift actuator, for example, is fixed to the engine. This causes the engine to further increase in size. Installing such a large engine requires a considerably large space, thus reducing layout flexibility. In the vehicle disclosed in U.S. Pat. No. 5,967,252, the shift actuator and the transmission are spaced apart from each other, so that a component, such as a cable, for use in operating the transmission increases in length. Consequently, a resulting transmission system increases in size.

SUMMARY OF THE INVENTION

Accordingly, preferred embodiments of the present invention provide a vehicle including a transmission case, an engine case, and a shift actuator whose layout is significantly improved.

A vehicle according to a preferred embodiment of the present invention includes a body frame, an engine, a transmission, a transmission case, and a shift actuator. The engine includes an engine case attached to the body frame, and a crankshaft disposed inside of and supported by the engine case. The transmission includes a main shaft, a drive shaft, and a shift drum. The main shaft is provided with a plurality of first gears including at least one first movable gear that is axially movable. The main shaft rotates when receiving a driving force from the crankshaft. The drive shaft is provided with a plurality of second gears including at least one second movable gear that is axially movable. The second gears intermesh with the first gears. The shift drum is in engagement with a shift fork that is in engagement with the first and second gears. The transmission case is spaced apart from the engine case, and houses the transmission. The shift actuator is connected to the shift drum, and rotates with the shift drum. At least a portion of the transmission case overlaps with the engine case when viewed along the axis of the crankshaft. The shift actuator is fixed to the transmission case.

Various preferred embodiments of the present invention provide a vehicle including a transmission case, an engine case, and a shift actuator whose layout is significantly improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
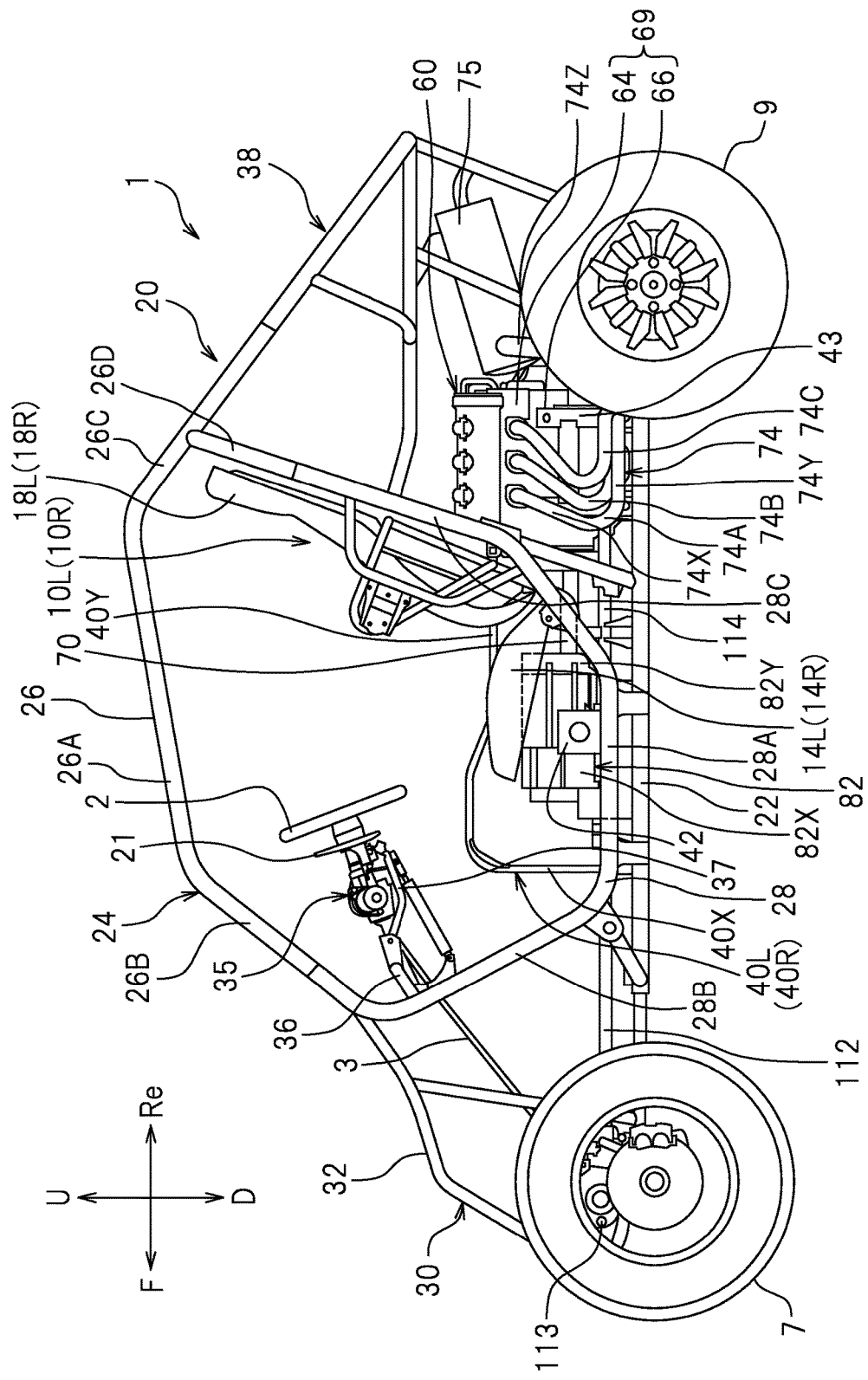
FIG. 1 is a left side view of an ROV according to a preferred embodiment of the present invention.

Hereinafter, vehicles according to various preferred embodiments of the present invention will be described. As illustrated in FIG. 1, a vehicle according to a preferred embodiment is preferably a recreational off-highway vehicle (ROV) 1, for example. The ROV 1 is suitable for traveling over rough terrain. The vehicle according to other preferred embodiments of the present invention is not limited to an ROV, but may be any other vehicle, such as an ATV.

Unless otherwise noted, the terms "front", "rear", "right", "left", "up", and "down" respectively refer to front, rear, right, left, up, and down with respect to a driver sitting on a seat 10L of the ROV 1 in the following description. The terms "up" and "down" respectively refer to the vertically upward direction and the vertically downward direction when the ROV 1 is stationary on a horizontal plane. Reference signs "F", "Re", "R", "L", "U", and "D" in the drawings respectively represent front, rear, right, left, up, and down.

As illustrated in FIG. 1, the ROV 1 preferably includes a body frame 20 that is preferably a pipe frame, for example. The body frame 20 preferably includes right and left main frames 22 each extending in the front-rear direction of the vehicle, a center frame 24 disposed higher than the main frames 22, a front frame 30 disposed in front of the center frame 24, and a rear frame 38 disposed behind the center frame 24.

The center frame 24 preferably includes right and left upper center subframes 26 and right and left lower center subframes 28. The right and left upper center subframes 26 are disposed above the right and left lower center subframes 28, respectively. The right and left upper center subframes 26 are connected to the right and left lower center subframes 28, respectively. The upper center subframes 26 preferably each include a first section 26A extending substantially in the front-rear direction of the vehicle, a second section 26B extending obliquely downward and forward from the front end of the first section 26A, a third section 26C extending obliquely downward and rearward from the rear end of the first section 26A, and a fourth section 26D extending obliquely downward and forward from a location somewhere along the third section 26C. The right and left lower center subframes 28 are disposed higher than the right and left main frames 22, respectively. The right and left lower center subframes 28 are joined to the right and left main frames 22, respectively. The right and left lower center subframes 28 preferably each include a first section 28A extending substantially in the front-rear direction of the vehicle, a second section 28B extending obliquely upward and forward from the front end of the first section 28A, and a third section 28C extending obliquely upward and rearward from the rear end of the first section 28A. The first sections 28A of the right and left lower center subframes 28 are joined to the right and left main frames 22, respectively. The second sections 28B of the right and left lower center subframes 28 are connected to the second sections 26B of the right and left upper center subframes 26, respectively. The third sections 28C of the right and left lower center subframes 28 are connected to the fourth sections 26D of the right and left upper center subframes 26, respectively.

Figure 2:
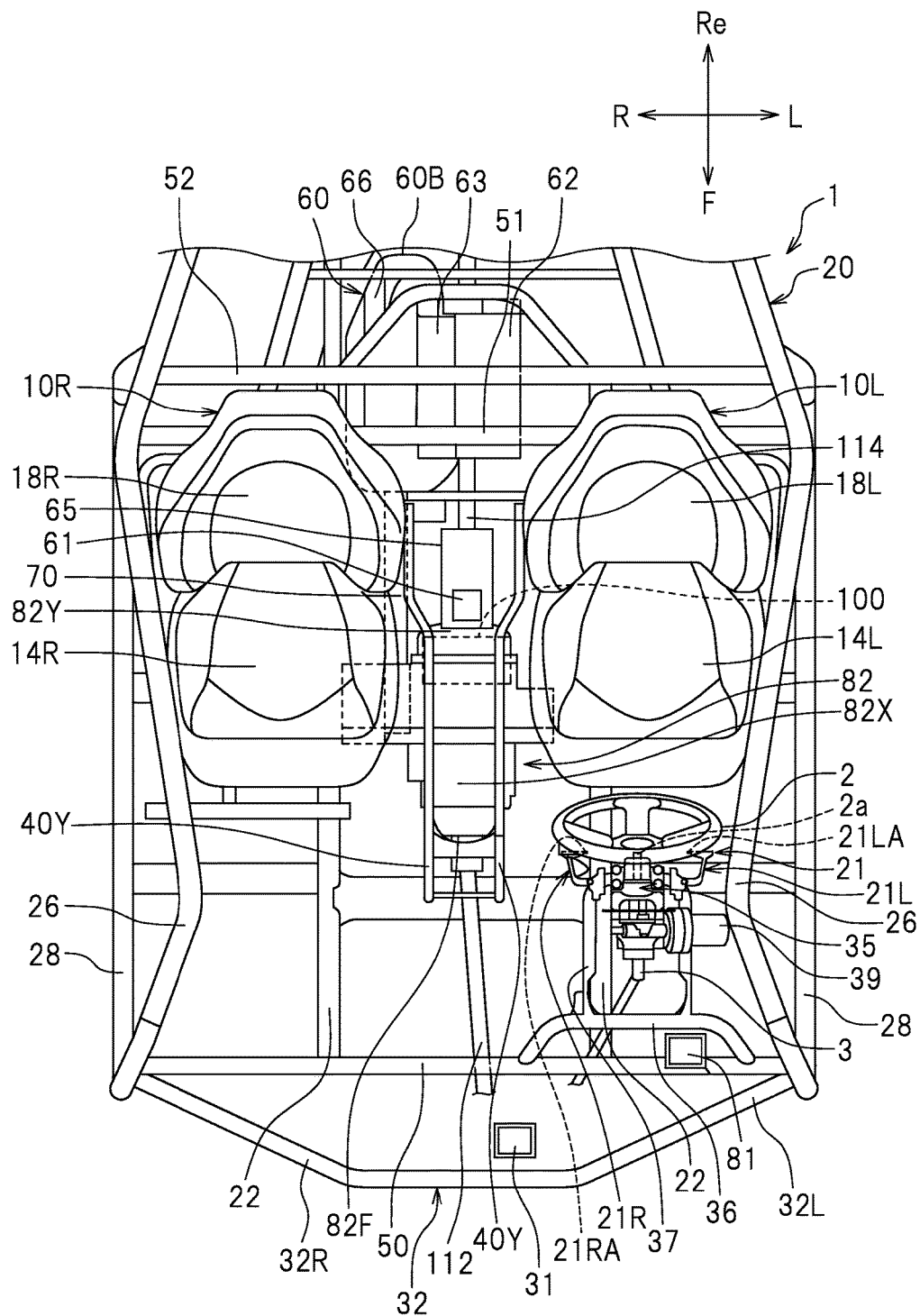
FIG. 2 is a partial plan view of the ROV.

As illustrated in FIG. 2, the body frame 20 preferably further includes cross members 50, 51, and 52. The cross members 50, 51, and 52 extend in the width direction of the vehicle. The cross member 51 is disposed rearward of the cross member 50. The cross member 52 is disposed rearward of the cross member 51. The cross members 50 and 51 are each connected to the right and left lower center subframes 28. The cross member 52 is connected to the right and left upper center subframes 26.

As illustrated in FIGS. 1 and 2, the front frame 30 preferably includes an upper front subframe 32 defining an upper portion of the front frame 30. The upper front subframe 32 is connected to the cross member 50. The upper front subframe 32 preferably includes a left portion 32L and a right portion 32R. The right end of the left portion 32L and the left end of the right portion 32R are joined to each other. The left end of the left portion 32L and the right end of the right portion 32R are joined to the cross member 50.

The ROV 1 preferably further includes a steering wheel 2. The steering wheel 2 is disposed behind the cross member 50. The steering wheel 2 is joined to a steering pivot 2a. The steering pivot 2a is rotatably supported by a pivot support 35. The pivot support 35 is fixed to a U-shaped or substantially U-shaped supporting frame 37. The supporting frame 37 is fixed to a U-shaped or substantially U-shaped cross member 36. The cross member 36 is fixed to the cross member 50. The pivot support 35 is provided with a power steering system 39 that assists the driver in turning the steering wheel 2. The power steering system 39 is disposed leftward relative to the steering pivot 2a. The steering wheel 2 is rotatable around the steering pivot 2a and relative to the pivot support 35. A steering shaft 3 is attached to the front end portion of the steering pivot 2a. A paddle shifter 21 is provided in front of the steering wheel 2. The paddle shifter 21 allows the driver to shift gears manually. The paddle shifter 21 preferably includes a left paddle 21L, and a right paddle 21R separate from the left paddle 21L. The left paddle 21L is disposed leftward relative to the steering pivot 2a. The right paddle 21R is disposed rightward relative to the steering pivot 2a. The left paddle 21L of the paddle shifter 21 is provided with a downshifter 21LA. The right paddle 21R of the paddle shifter 21 is provided with an upshifter 21RA. The downshifter 21LA allows the driver to shift a transmission 80 to a lower gear (i.e., downshift the transmission 80). The upshifter 21RA allows the driver to shift the transmission 80 to a higher gear (i.e., upshift the transmission 80). The downshifter 21LA is marked with a "−" symbol, for example, and the upshifter 21RA is marked with a "+" symbol, for example. Thus, the driver is able to control the traveling direction of the ROV 1 with the steering wheel 2, and to shift gears with the paddle shifter 21.

Referring again to FIG. 1, the ROV 1 preferably further includes right and left front wheels 7, and right and left rear wheels 9. The right and left front wheels 7 are attached to an axle (not illustrated) provided on the front frame 30. The right and left rear wheels 9 are attached to an axle (not illustrated) provided on the rear frame 38. The right and left front wheels 7 are steered with the steering wheel 2, thus controlling the traveling direction of the ROV 1.

As illustrated in FIG. 2, the left seat 10L and a right seat 10R are disposed rearward of the steering wheel 2. The left seat 10L is supported by the left main frame 22. The right seat 10R is similarly supported by the right main frame 22. The right seat 10R is disposed rightward of the left seat 10L. The left seat 10L preferably includes a seat portion 14L on which the driver sits, and a backrest 18L. The right seat 10R preferably similarly includes a seat portion 14R on which a passenger sits, and a backrest 18R.

Figure 9:
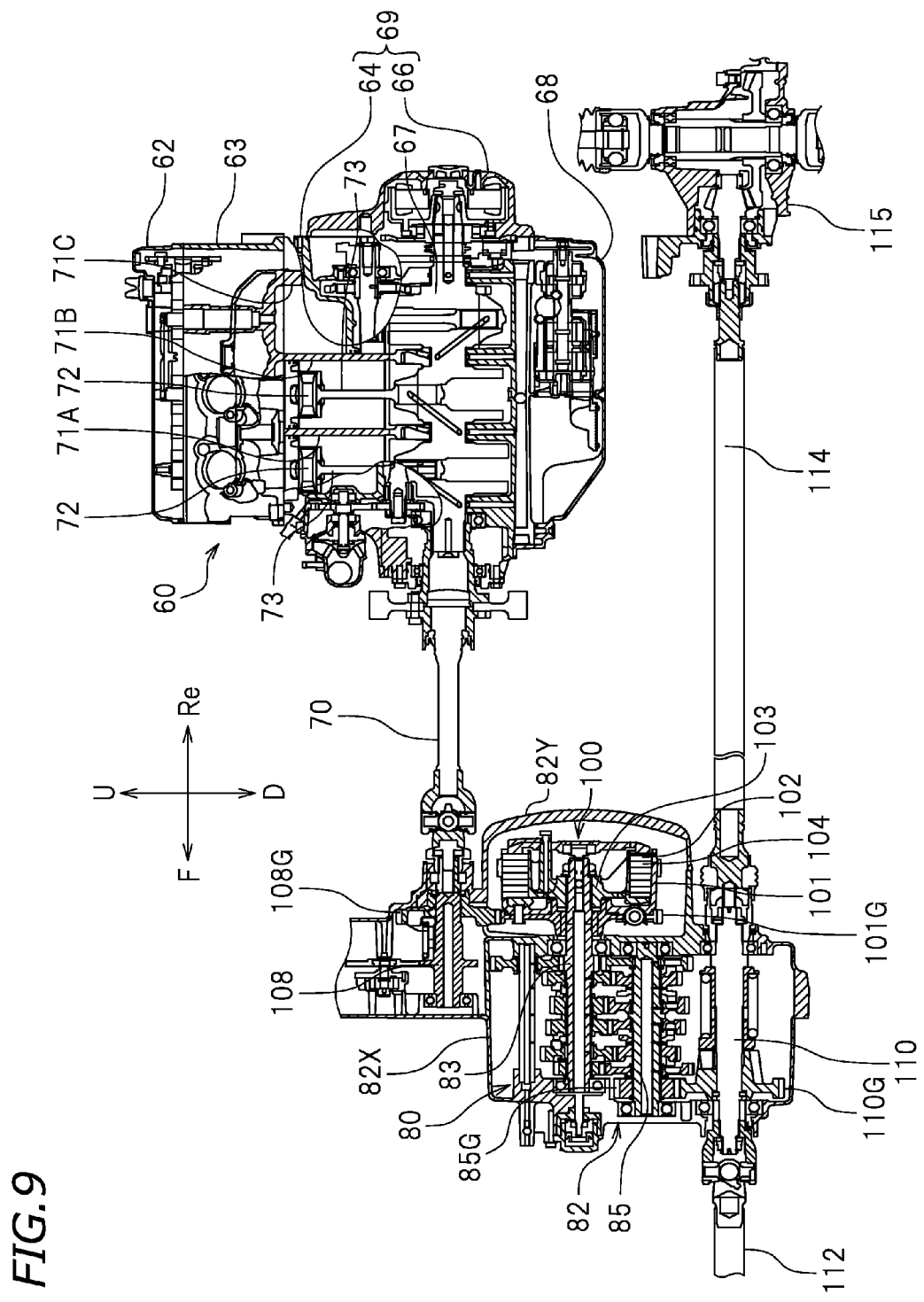
FIG. 9 is a cross-sectional view of an engine and a transmission.

The ROV 1 preferably further includes an engine 60. As illustrated in FIG. 9, the engine 60 preferably includes a crankcase 66, a cylinder body 64, a cylinder head 63, and a cylinder head cover 62. The engine 60 is supported on a rear portion of the main frames 22 of the body frame 20. The engine 60 is disposed rearward relative to the seat portion 14L of the left seat 10L and the seat portion 14R of the right seat 10R. The ROV 1 preferably further includes an exhaust system 74 through which exhaust gas discharged from the engine 60 flows, and a silencer 75. The exhaust system 74 is connected to the engine 60. The exhaust system 74 preferably includes first, second, and third exhaust pipes 74A, 74B, and 74C that are respectively in communication with first, second, and third cylinders 71A, 71B, and 71C (which are illustrated in FIG. 9 and will be described below). The first to third exhaust pipes 74A to 74C preferably each include a first section 74X extending obliquely downward and forward from the cylinder head 63 (see FIG. 9), and a second section 74Y extending rearward from the first section 74X. The rear end portions of the second sections 74Y of the first to third exhaust pipes 74A to 74C are combined into a third section 74Z. The rear end portion of the third section 74Z is connected with the silencer 75. In FIG. 2, the exhaust system 74 and the silencer 75 are not illustrated for the sake of convenience.

Figure 3:
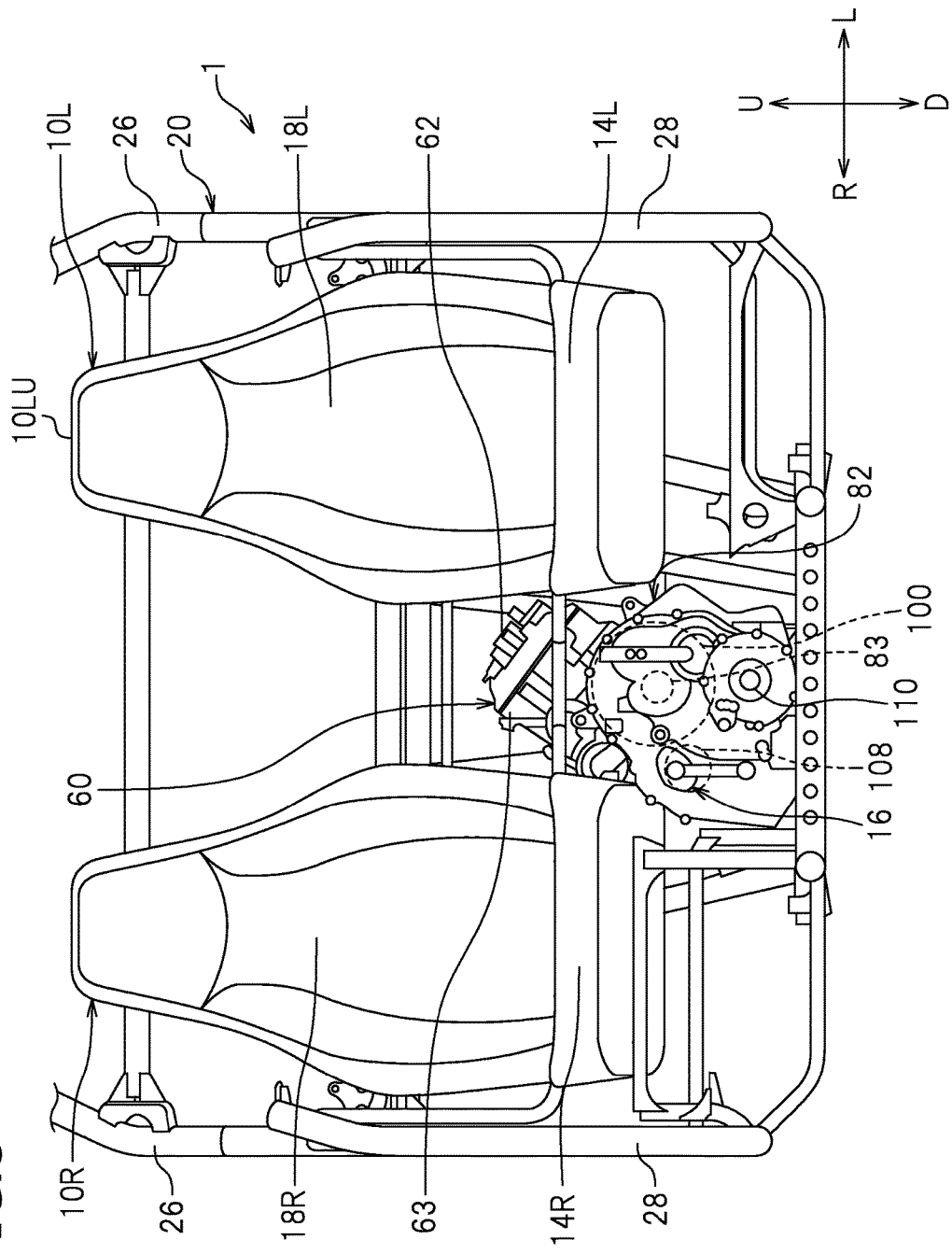
FIG. 3 is a front view of components of the ROV, such as seats.

As illustrated in FIG. 1, the ROV 1 preferably includes the transmission 80 (see FIG. 6) to change torque from the engine 60 and output the resulting torque, and a transmission case 82 housing the transmission 80. The transmission case 82 is disposed lower than the steering wheel 2 and the paddle shifter 21. As illustrated in FIG. 2, at least a portion of the transmission case 82 is disposed between the right and left seats 10R and 10L in the width direction of the vehicle. Similarly to the engine 60, the transmission case 82 is attached to the main frames 22 of the body frame 20. The transmission case 82 preferably includes a case body 82X and a case cover 82Y. The transmission case 82 is a component separate from the crankcase 66. This means that the transmission 80 is separate from the engine 60. The transmission case 82 is disposed on a forward portion of the body frame 20, and the crankcase 66 is disposed on a rearward portion of the body frame 20. In other words, the transmission 80 is spaced apart from the engine 60. The transmission 80 is disposed on the forward portion of the body frame 20, and the engine 60 is disposed on the rearward portion of the body frame 20. As used herein, the term "forward portion" refers to a portion of a component located forward relative to the intermediate position of the component in the front-rear direction of the vehicle, and the term "rearward portion" refers to a portion of a component located rearward relative to the intermediate position of the component in the front-rear direction of the vehicle. As illustrated in FIG. 3, the engine 60 and the transmission case 82 are aligned in the front-rear direction of the vehicle, and thus overlap with each other in a front view of the vehicle. Note that the cylinder head cover 62 and the transmission case 82 do not overlap with each other in the front view of the vehicle.

Figure 4:
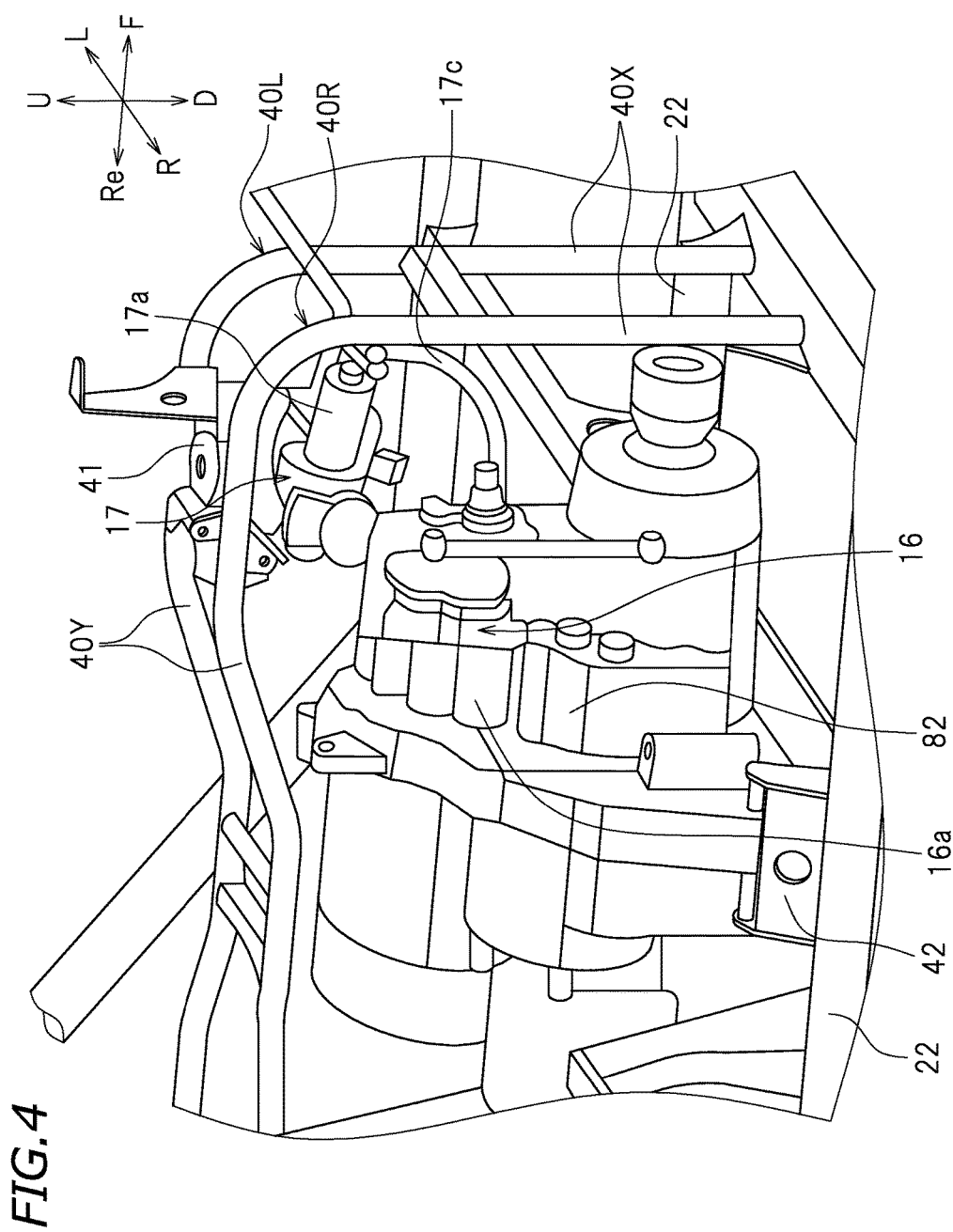
FIG. 4 is a perspective view of components of the ROV, such as a transmission case.

As illustrated in FIGS. 1 and 4, the ROV 1 preferably further includes an auxiliary frame 40L and an auxiliary frame 40R that are disposed substantially in the widthwise center of the ROV. The auxiliary frame 40R is disposed rightward of the auxiliary frame 40L. The auxiliary frames 40L and 40R preferably each include a first section 40X disposed below the steering wheel 2 and extending upward from the associated main frame 22, and a second section 40Y extending rearward from the first section 40X.

Figure 5:
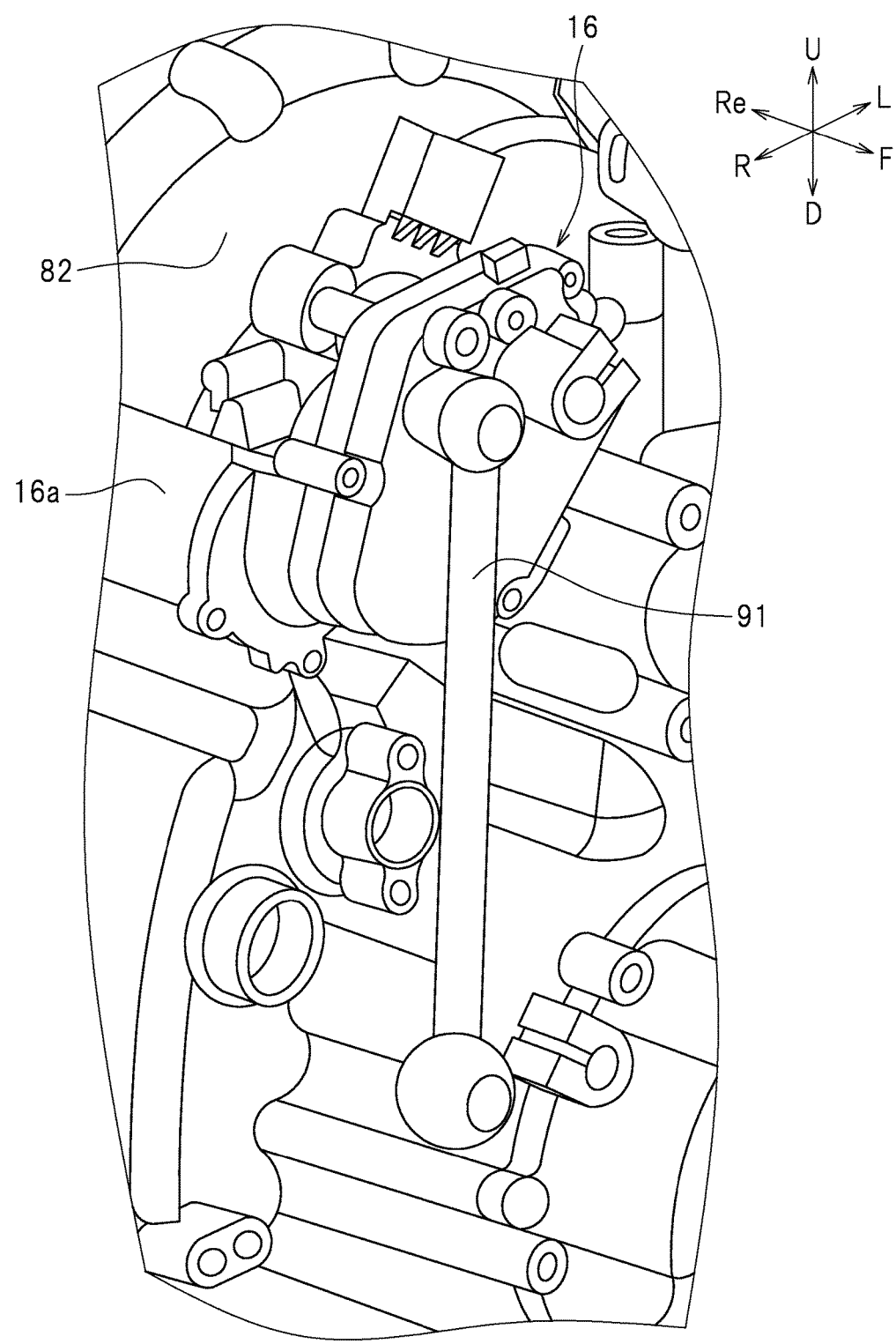
FIG. 5 is a perspective view of components of the ROV, such as the transmission case and a shift actuator.
Figure 6:
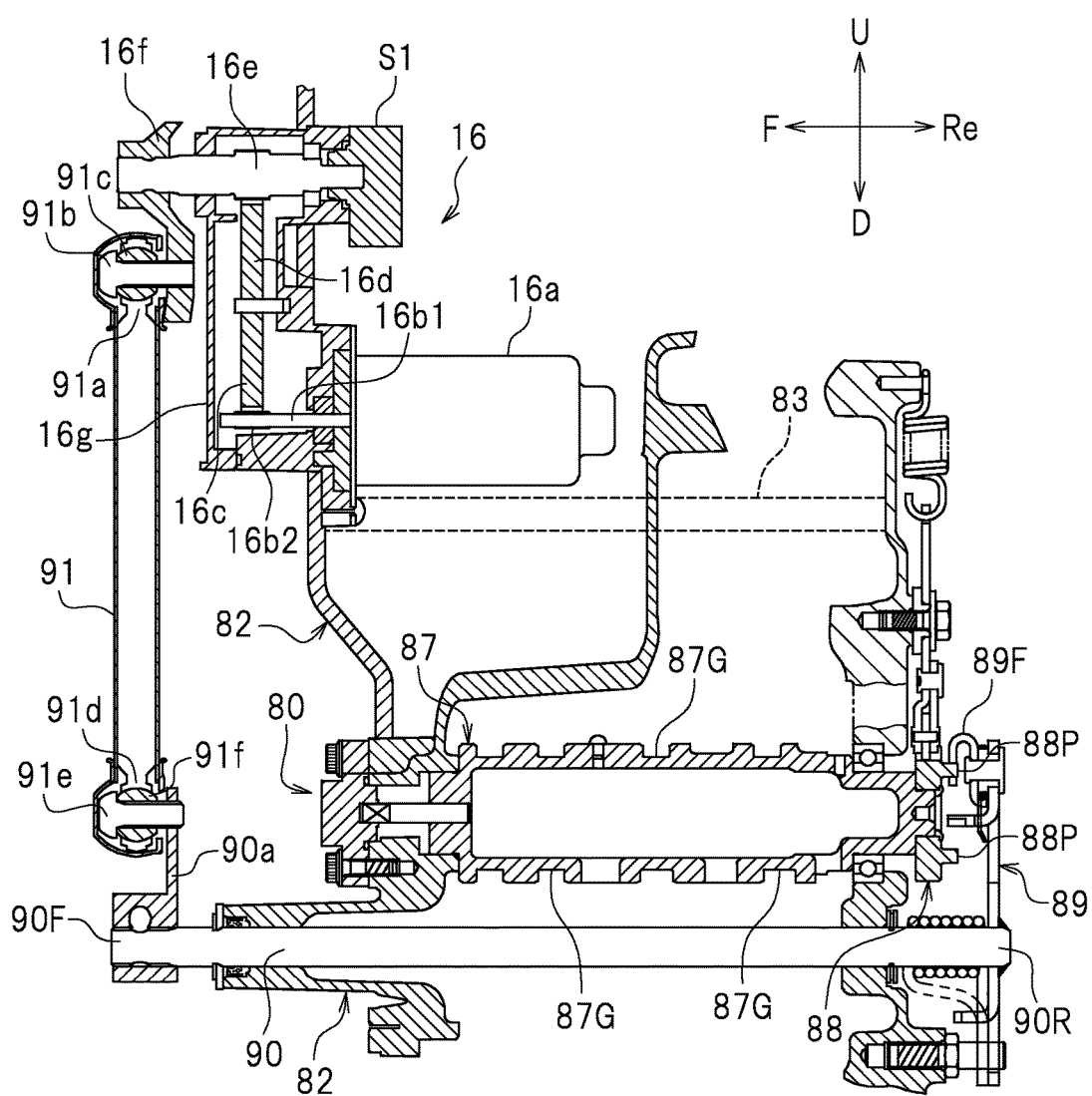
FIG. 6 is a cross-sectional view of components of the ROV, such as a shift drum.

As illustrated in FIG. 4, the transmission case 82 housing the transmission 80 is disposed behind the first sections 40X of the auxiliary frames 40L and 40R. The transmission case 82 is supported by a first fixation member 42. The first fixation member 42 is fixed to the left main frame 22 (which may also be referred to as a "first subframe") of the body frame 20 and the right main frame 22 (which may also be referred to as a "second subframe") of the body frame 20 so as to extend in the width direction of the vehicle. As illustrated in FIG. 1, the cylinder body 64 and the crankcase 66 (which will be described in detail below) are disposed behind the right and left seats 10R and 10L, and supported by a second fixation member 43. The second fixation member 43 is disposed rearward relative to the first fixation member 42 and fixed to the right and left main frames 22 so as to extend in the width direction of the vehicle. As illustrated in FIG. 5, a shift actuator 16 is fixed to the transmission case 82. The shift actuator 16 preferably includes a motor 16a. The shift actuator 16 is connected with a shift rod 91. As illustrated in FIG. 6, the shift rod 91 is connected to a shift shaft (input shaft) 90 via a shift operation lever 90a (which will be described below). The shift actuator 16 and the associated components will be described in more detail below.

Figure 8:
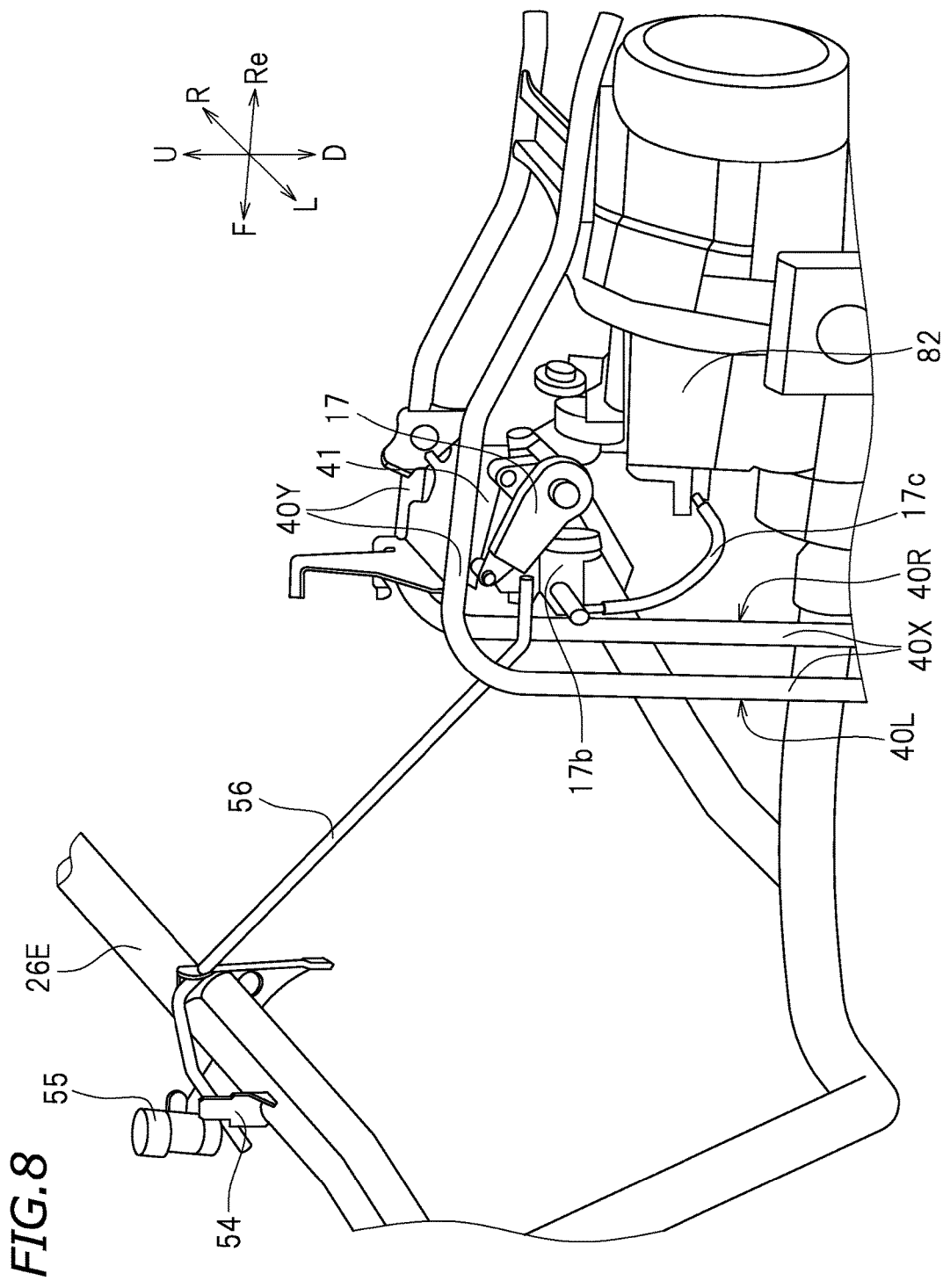
FIG. 8 is a perspective view of components of the ROV, such as a reserve tank.

The second section 40Y of the auxiliary frame 40L is provided with a bracket 41 (see FIGS. 4 and 8). The bracket 41 supports a clutch actuator 17. The clutch actuator 17 engages and disengages a clutch 100 (which is illustrated in FIG. 9 and will be described below). As illustrated in FIGS. 4 and 8, the clutch actuator 17 preferably includes a motor 17a, and a hydraulic cylinder 17b connected to the motor 17a. The hydraulic cylinder 17b is connected through a pipe 17c to the clutch 100 provided inside the transmission case 82. Examples of the pipe 17c include a flexible pipe, such as a rubber tube. The motor 17a of the clutch actuator 17 is driven in response to a control signal output from a controller (not illustrated). The driving force in this case is amplified by the hydraulic cylinder 17b and then transmitted to the clutch 100 inside the transmission case 82. Alternatively, the clutch actuator 17 may actuate the clutch 100 with only the driving force of the motor 17a.

As illustrated in FIG. 6, the transmission 80 preferably includes the shift shaft 90. The shift shaft 90 is rotatable, and extends in the front-rear direction of the vehicle. The shift shaft 90 is supported by the transmission case 82. The shift shaft 90 preferably includes a rear end portion 90R to which a shift lever 89 is fixed. The shift shaft 90 preferably further includes a front end portion 90F located outward of the transmission case 82.

The transmission 80 preferably includes a rotational plate 88 and the shift lever 89. The rotational plate 88 preferably includes a plurality of pins 88P. The rotational plate 88 is fixed to the rear end of a shift drum 87. The rotational plate 88 rotates together with the shift drum 87. The shift lever 89 is brought into engagement with the rotational plate 88. The shift lever 89 is provided with a hook 89F engageable with the pin(s) 88P of the rotational plate 88.

As illustrated in FIG. 6, the shift actuator 16 preferably includes the motor 16a, a motor shaft 16b1 provided in the motor 16a, a gear 16b2 provided on the motor shaft 16b1, reduction gears 16c and 16d, a drive shaft (output shaft) 16e, and an operation lever 16f. The motor 16a of the shift actuator 16 rotates in response to a signal from the controller (not illustrated). The rotation of the motor 16a rotates the gear 16b2 of the motor shaft 16b1. The rotation of the gear 16b2 causes the reduction gears 16c and 16d to rotate in conjunction with each other, thus rotating the drive shaft 16e. The motor shaft 16b1 of the shift actuator 16 is parallel or substantially parallel with a main shaft 83 (which is illustrated in FIG. 9 and will be described below).

The drive shaft 16e is provided with the operation lever 16f. The shift rod 91 preferably includes a shift actuator-side connector (first connector) 91a. The shift actuator-side connector 91a is connected to the operation lever 16f with a bolt 91b, for example. The shift actuator-side connector 91a is rotatable with respect to the bolt 91b via a bearing 91c.

The drive shaft 16e is further provided with a shift position sensor S1. The shift position sensor S1 is disposed on the rear end of the drive shaft 16e. The shift position sensor S1 acquires shift position information from the rotation of the drive shaft 16e, and provides the shift position information to the controller (not illustrated). The controller is configured or programmed to control the rotation of the motor 16a based on the shift position information acquired.

The shift rod 91 preferably further includes a shift mechanism-side connector (second connector) 91d. The shift mechanism-side connector 91d is connected to the shift operation lever 90a with a bolt 91e, for example. The shift mechanism-side connector 91d is rotatable with respect to the bolt 91e via a bearing 91f. The shift operation lever 90a is rotatably provided on the front end portion 90F of the shift shaft 90.

Movement of the shift rod 91 in the up-down direction of the vehicle causes the shift operation lever 90a to move. Thus, the shift operation lever 90a rotates the shift shaft 90. The controller (not illustrated) is configured or programmed to drive the motor 16a of the shift actuator 16 in response to an operation performed on the paddle shifter 21 (see FIG. 1) by the driver. This rotates the shift shaft 90 via the shift rod 91 so as to rotate the shift lever 89. With this rotation, the hook 89F of the shift lever 89 is brought into engagement with the pin(s) 88P of the rotational plate 88, causing the shift drum 87 to rotate together with the rotational plate 88. As a result, the transmission gear ratio changes.

As illustrated in FIG. 6, the shift actuator 16 is fixed to the transmission case 82. The shift actuator 16 preferably further includes a gear case 16g housing the motor 16a, the motor shaft 16b1, the gear 16b2, the reduction gears 16c and 16d, and the drive shaft 16e. The gear case 16g is fixed on the transmission case 82 with a bolt, for example, thus fixing the shift actuator 16 to the transmission case 82.

As illustrated in FIG. 8, the right and left upper center subframes 26 preferably further include a fifth section 26E extending along the width direction of the vehicle. The fifth section 26E is disposed between the right and left second sections 26B of the right and left upper center subframes 26 (see FIG. 1). The fifth section 26E of the upper center subframes 26 is disposed higher than the clutch actuator 17 in the up-down direction of the vehicle. A bracket 54 is fixed to the fifth section 26E of the upper center subframes 26. The bracket 54 supports a reserve tank 55. The reserve tank 55 stores hydraulic oil. The reserve tank 55 is disposed higher than the clutch actuator 17 in the up-down direction of the vehicle. The reserve tank 55 and the clutch actuator 17 are connected to each other through a pipe 56. The hydraulic oil in the reserve tank 55 is supplied to the clutch actuator 17 through the pipe 56.

Next, a power transmission mechanism including the engine 60 and the transmission 80 of the ROV 1 according to a preferred embodiment of the present invention will be described in detail. As illustrated in FIG. 9, the engine 60 preferably includes the crankcase 66, the cylinder body 64, the cylinder head 63, and the cylinder head cover 62 as previously mentioned. Disposed below the crankcase 66 is an oil pan 68 to collect oil that has flowed through the engine 60. The cylinder body 64 extends upward from the crankcase 66. The cylinder head 63 is disposed on the cylinder body 64 and joined to the upper portion of the cylinder body 64. The cylinder head cover 62 is disposed on the cylinder head 63 and joined to the upper portion of the cylinder head 63.

The engine 60 preferably further includes a crankshaft 67 extending in the front-rear direction of the vehicle. The crankshaft 67 is disposed inside an engine case 69. The engine case 69 includes the crankcase 66 and the cylinder body 64, for example. The engine case 69 supports the crankshaft 67. In the present preferred embodiment, the crankshaft 67 is preferably supported by a mating surface between the crankcase 66 and the cylinder body 64. The front end portion of the crankshaft 67 is connected with a connecting shaft 70. The connecting shaft 70 is connected to an input shaft 108.

The first, second, and third cylinders 71A, 71B, and 71C are provided inside the cylinder body 64. The first, second, and third cylinders 71A, 71B, and 71C extend upward from a lateral portion of the crankcase 66. The first, second, and third cylinders 71A, 71B, and 71C are aligned in the front-rear direction of the vehicle. The second cylinder 71B is disposed behind the first cylinder 71A. The third cylinder 71C is disposed behind the second cylinder 71B. The engine 60 is preferably a three cylinder engine, for example. The first, second, and third cylinders 71A, 71B, and 71C each contain a piston 72. Each piston 72 is connected to the crankshaft 67 via an associated connecting rod 73. Although the engine 60 according to the present preferred embodiment is preferably a three cylinder engine equipped with the first, second, and third cylinders 71A, 71B, and 71C, the engine 60 may be a single cylinder engine, or may be a multi-cylinder engine equipped with two cylinders or four or more cylinders.

The transmission 80 preferably includes the input shaft 108, the clutch 100, the main shaft 83, a drive shaft 85, and an output shaft 110. As illustrated in FIG. 9, the clutch 100 is disposed closer to the engine 60 than the shift drum 87 (see FIG. 10) is to the engine 60. The input shaft 108 extends in the front-rear direction of the vehicle. The input shaft 108 is housed in the transmission case 82. The input shaft 108 is preferably disposed coaxially with the crankshaft 67. The shaft center (not illustrated) of the input shaft 108 may be out of alignment with the shaft center (not illustrated) of the crankshaft 67. The input shaft 108 is connected to the connecting shaft 70. The input shaft 108 rotates when receiving a driving force from the crankshaft 67. The input shaft 108 is provided with a gear 108G. Although the input shaft 108 is preferably connected to the crankshaft 67 via the connecting shaft 70 in the present preferred embodiment, the input shaft 108 may alternatively be directly connected to the crankshaft 67.

Figure 10:
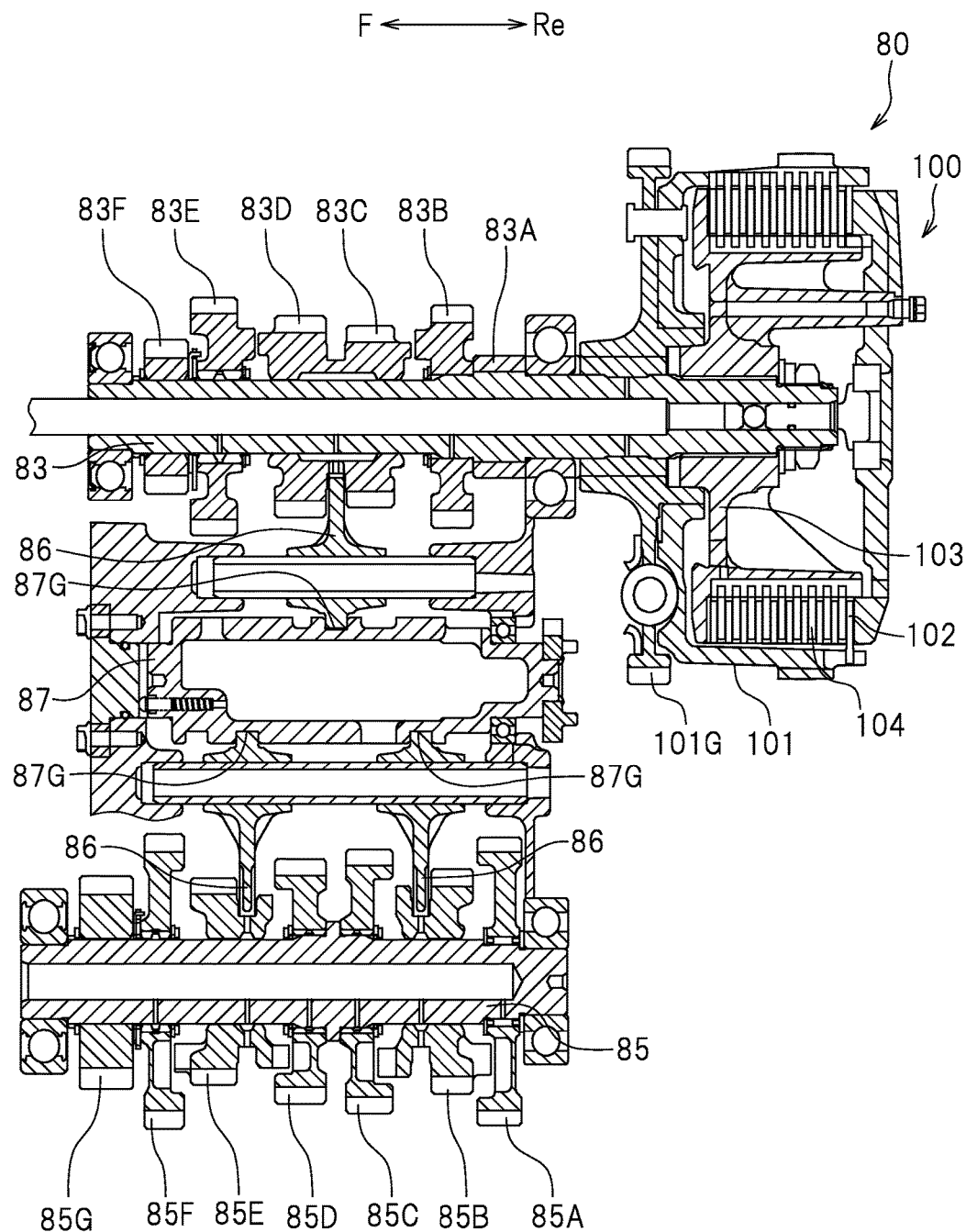
FIG. 10 is a cross-sectional view of the transmission.

The clutch 100 is a hydraulic clutch, such as a wet, multi-plate friction clutch, for example. Torque generated by the crankshaft 67 is transmitted to the clutch 100 through the input shaft 108. The clutch 100 transmits or cuts off the torque generated by the crankshaft 67. The clutch 100 is disposed inside the transmission case 82. The clutch 100 is exposed by detaching the case cover 82Y of the transmission case 82 from the case body 82X. The clutch 100 is provided on the rear end portion of the main shaft 83. As illustrated in FIG. 10, the clutch 100 is located rearward relative to main shaft gears 83A to 83F provided on the main shaft 83. The main shaft gears 83A to 83F of the main shaft 83 are provided between the shift actuator 16 (see FIG. 6) and the clutch 100. The clutch 100 is located rearward relative to drive shaft gears 85A to 85F provided on the drive shaft 85. As illustrated in FIG. 2, the clutch 100 is disposed between the right and left seats 10R and 10L. As illustrated in FIG. 10, the clutch 100 preferably includes a clutch housing 101, a clutch boss 103, a plurality of driving plates 102, and a plurality of driven plates 104. The driving plates 102 are provided inward of the clutch housing 101. The driving plates 102 rotate together with the clutch housing 101. The torque of the crankshaft 67 (see FIG. 9) is transmitted to the driving plates 102. The driven plates 104 are provided outward of the clutch boss 103. The driven plates 104 rotate together with the clutch boss 103. The driving plates 102 and the driven plates 104 are arranged alternately in the front-rear direction of the vehicle. The clutch housing 101 is provided with a gear 101G. As illustrated in FIG. 9, the gear 101G intermeshes with the gear 108G of the input shaft 108. Thus, the clutch housing 101 is connected to the input shaft 108. Alternatively, the clutch 100 may be a single-plate friction clutch or a dry friction clutch.

The main shaft 83 extends in the front-rear direction of the vehicle. The main shaft 83 is housed in the transmission case 82. The main shaft 83 is parallel or substantially parallel to the input shaft 108. The main shaft 83 is fixed to the clutch boss 103. The main shaft 83 rotates together with the clutch boss 103. The main shaft 83 rotates by receiving a driving force from the crankshaft 67. As illustrated in FIG. 10, the main shaft 83 is provided with the main shaft gears 83A to 83F. The main shaft gears 83A, 83B, 83E, and 83F are fixed gears that are immovable along the axis of the main shaft 83. The main shaft gears 83C and 83D are movable gears that are movable along the axis of the main shaft 83. The main shaft gears 83A to 83F rotate together with the main shaft 83. The main shaft gears 83B and 83E may rotate with respect to the main shaft 83 depending on intermeshing states thereof.

Figure 7:
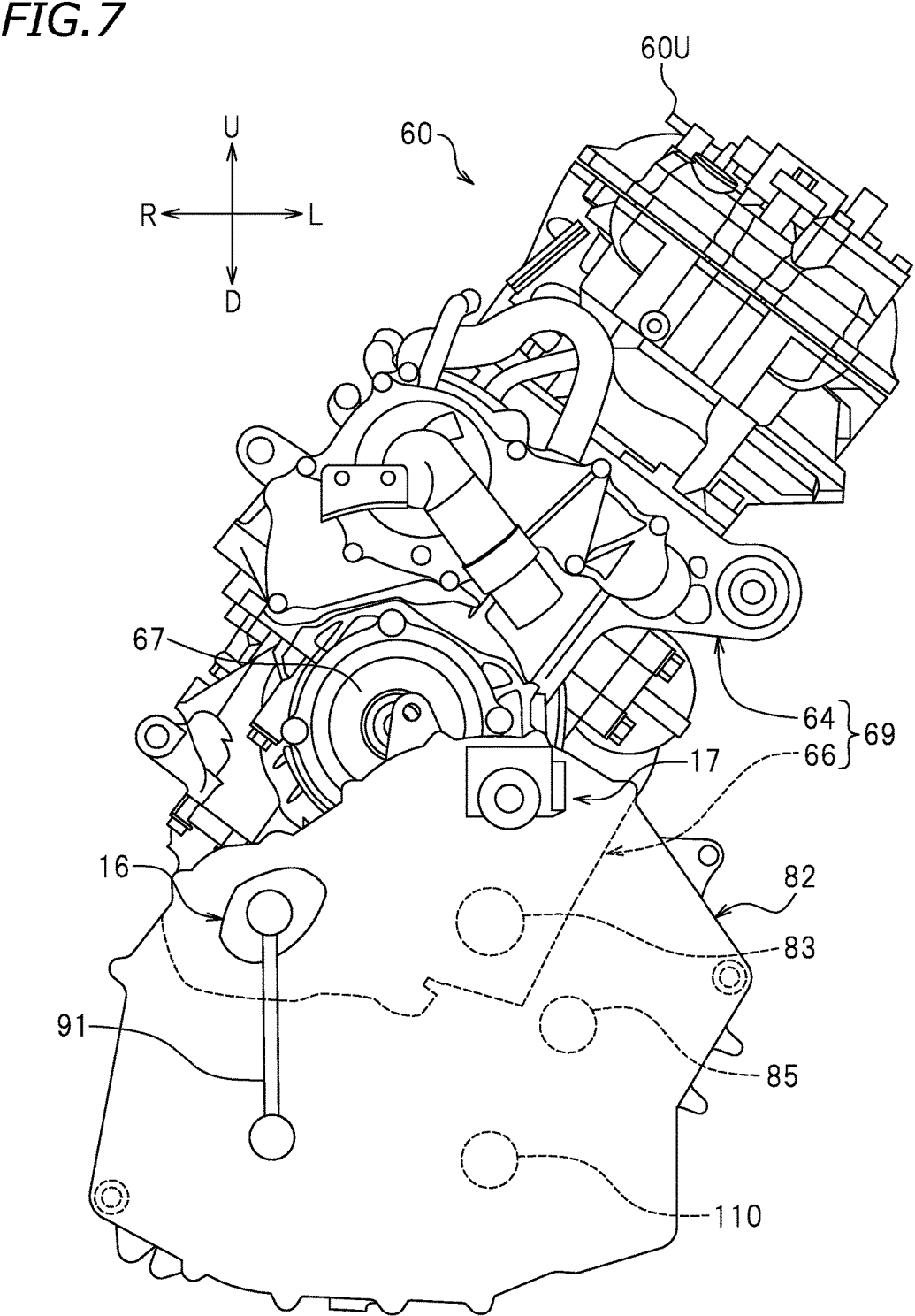
FIG. 7 is an explanatory diagram illustrating the positional relationship between the transmission case and crankcase.

Thus, as illustrated in FIG. 7, at least a portion of the transmission case 82 overlaps with the crankcase 66 when viewed along the axis of the crankshaft 67. At least a portion of the shift actuator 16 overlaps with the crankcase 66 when viewed along the axis of the crankshaft 67. At least a portion of the clutch actuator 17 overlaps with the crankcase 66 when viewed along the axis of the crankshaft 67. As illustrated in FIG. 7, the shift actuator 16 is disposed lower than an upper end 60U of the engine 60. As illustrated in FIG. 3, the shift actuator 16 is disposed lower than an upper end 10LU of the left seat 10L.

The drive shaft 85 is provided inside the transmission case 82, and extends in the front-rear direction of the vehicle. The drive shaft 85 is parallel or substantially parallel to the main shaft 83. As illustrated in FIG. 10, the drive shaft 85 is provided with the drive shaft gears 85A to 85F. The drive shaft gears 85A to 85F respectively intermesh with the main shaft gears 83A to 83F. The drive shaft gears 85A, 85C, 85D, and 85F are fixed gears that are immovable along the axis of the drive shaft 85. The drive shaft gears 85B and 85E are movable gears that are movable along the axis of the drive shaft 85. The drive shaft gears 85A to 85F rotate together with the drive shaft 85. The drive shaft gears 85A, 85C, 85D, and 85F may rotate with respect to the drive shaft 85 depending on intermeshing states thereof. The front end portion of the drive shaft 85 is provided with a gear 85G. The gear 85G is disposed forward relative to the drive shaft gear 85F.

As illustrated in FIG. 9, the output shaft (which may also be referred to as a middle shaft) 110 is provided inside the transmission case 82, and extends in the front-rear direction of the vehicle. The output shaft 110 is provided with a gear 110G. The gear 110G intermeshes with the gear 85G of the drive shaft 85. Thus, the output shaft 110 is connected to the drive shaft 85. The output shaft 110 rotates by receiving a driving force from the drive shaft 85. The front end portion of the output shaft 110 is connected with a front propeller shaft 112. The front propeller shaft 112 extends in the front-rear direction of the vehicle. The front propeller shaft 112 rotates by receiving a driving force from the output shaft 110. The front propeller shaft 112 is connected to the right and left front wheels 7 via a front differential 113 (see FIG. 1). The rear end portion of the output shaft 110 is connected with a rear propeller shaft 114. The rear propeller shaft 114 extends in the front-rear direction of the vehicle. The rear propeller shaft 114 rotates by receiving a driving force from the output shaft 110. The rear propeller shaft 114 is connected to the right and left rear wheels 9 via a final gear 115. The ROV 1 according to the present preferred embodiment is preferably a four-wheel drive vehicle as just described, but is not limited to such a vehicle.

As illustrated in FIG. 10, the transmission 80 preferably includes the shift drum 87 and a shift fork 86. The shift drum 87 is provided with a plurality of grooves 87G. The axial position of each groove 87G changes in accordance with an angle of rotation of the shift drum 87. Each groove 87G is in engagement with the shift fork 86. The shift fork 86 is in engagement with the main shaft gears 83C and 83D and the drive shaft gears 85B and 85E. Rotation of the shift drum 87 moves the shift fork 86 along the axis of the shift drum 87. The shift fork 86 in turn moves at least one of the main shaft gears 83C and 83D and the drive shaft gears 85B and 85E. This changes the combination of the intermeshing gears selected from the main shaft gears 83A to 83F and the drive shaft gears 85A to 85F, thus changing the transmission gear ratio.

As described above, the engine case 69 of the ROV 1 according to the present preferred embodiment is preferably attached to the body frame 20. The transmission case 82 housing the transmission 80 is spaced apart from the engine case 69. Thus, the engine case 69 and the transmission case 82 each have higher layout flexibility than when the engine case 69 and the transmission case 82 are integral with each other. The engine case 69 and the transmission case 82 are each disposed more compactly than when the engine case 69 and the transmission case 82 are integral with each other. This consequently prevents an increase in size of the vehicle. At least a portion of the transmission case 82 overlaps with the engine case 69 when viewed along the axis of the crankshaft 67. Thus, the engine case 69 and the transmission case 82 are disposed more compactly in the direction perpendicular or substantially perpendicular to the axis of the crankshaft 67 than when the engine case 69 and the transmission case 82 do not overlap with each other at all as viewed along the axis of the crankshaft 67. The shift actuator 16 is fixed to the transmission case 82. This allows the shift actuator 16 and the transmission case 82 to be handled as a single assembled component. In other words, the shift actuator 16 and the transmission case 82 are attached as a one-piece component to the body frame 20. Thus, the transmission case 82 and the shift actuator 16 are more unlikely to be misaligned than when the transmission case 82 is attached to the body frame 20 and then the shift actuator 16 is separately attached to the body frame 20. Consequently, the layout of the transmission case 82, the engine case 69, and the shift actuator 16 according to the present preferred embodiment is significantly improved in terms of making these components compact and preventing misalignment.

At least a portion of the shift actuator 16 of the ROV 1 according to the present preferred embodiment preferably overlaps with the engine case 69 as viewed along the axis of the crankshaft 67. Thus, the shift actuator 16 and the engine case 69 are disposed more compactly in the direction perpendicular or substantially perpendicular to the axis of the crankshaft 67 than when the shift actuator 16 and the engine case 69 do not overlap with each other at all as viewed along the axis of the crankshaft 67.

The crankshaft 67 of the ROV 1 according to the present preferred embodiment preferably extends in the front-rear direction of the vehicle. This enables the engine case 69, supporting the crankshaft 67, and the transmission case 82, housing the transmission 80 that receives a driving force from the crankshaft 67, to be disposed along the front-rear direction of the vehicle. Consequently, additional space is provided in the width direction of the vehicle, resulting in an increase in layout flexibility in the width direction of the vehicle.

The transmission case 82 of the ROV 1 according to the present preferred embodiment is preferably disposed forward relative to the engine case 69. This allows the engine case 69, which is comparatively large, to be disposed in a relatively large rearward space, and allows the transmission case 82, which is comparatively small, to be disposed in a relatively small forward space. Consequently, the space in the vehicle is utilized effectively.

The crankcase 66 of the ROV 1 according to the present preferred embodiment is preferably disposed rearward relative to the right and left seats 10R and 10L. This allows the engine case 69 to be disposed in a large space behind the right and left seats 10R and 10L. Thus, the space behind the right and left seats 10R and 10L is utilized effectively.

At least a portion of the transmission case 82 of the ROV 1 according to the present preferred embodiment is preferably disposed between the right and left seats 10R and 10L in the width direction of the vehicle. Thus, the transmission 80 housed in the transmission case 82 may be easily used in both of a manual transmission (MT) vehicle in which the gears of the transmission are shifted by a driver's operation, and an automated manual transmission (AMT) vehicle in which an actuator is driven by a driver's operation and the gears of the transmission are shifted by the actuator. More specifically, in the case of an MT vehicle, a shift operation lever disposed between the right and left seats 10R and 10L is located close to the transmission case 82. This prevents complication of a component connecting the shift operation lever and the transmission 80. In the case of an AMT vehicle, such as the ROV 1 according to the present preferred embodiment, the paddle shifter 21 is located close to the transmission case 82. This, similarly to the above case, prevents complication of a component connecting the paddle shifter 21 and the transmission 80.

The transmission case 82 of the ROV 1 according to the present preferred embodiment is preferably disposed lower than the paddle shifter 21 defining a shift operating element. Consequently, the center of gravity of the vehicle is lowered.

The clutch 100 of the ROV 1 according to the present preferred embodiment is preferably disposed closer to the engine 60 than the shift drum 87 is to the engine 60. Thus, a portion of the transmission case 82 housing the clutch 100 is disposed in a relatively large space between the shift drum 87 and the engine 60. In particular, if the clutch 100 has a large diameter, a portion of the transmission case 82 housing such a large diameter clutch will be disposed in the large space.

At least a portion of at least one of the main shaft gears 83A to 83F of the ROV 1 according to the present preferred embodiment is preferably provided between the shift actuator 16 and the clutch 100 along the axis of the main shaft 83. Thus, a one-piece assembly including the shift actuator 16 and the transmission case 82 is made compact. In particular, if the clutch 100 has a large diameter, for example, a portion of the transmission case 82 housing the clutch 100 will increase in size. In the present preferred embodiment, the shift actuator 16 is disposed opposite to the clutch 100, with the main shaft gears 83A to 83F interposed between the shift actuator 16 and the clutch 100. Consequently, the transmission case 82 to which the shift actuator 16 is fixed is made compact.

The shift actuator 16 of the ROV 1 according to the present preferred embodiment is preferably disposed lower than the upper end 60U of the engine 60. Thus, the one-piece assembly, composed of the shift actuator 16 and the transmission case 82, is made more compact than when the shift actuator 16 fixed to the transmission case 82 is disposed higher than the upper end 60U of the engine 60.

The shift actuator 16 of the ROV 1 according to the present preferred embodiment is preferably disposed lower than the upper end 10LU of the left seat 10L. Thus, the one-piece assembly, composed of the shift actuator 16 and the transmission case 82, is made more compact than when the shift actuator 16 fixed to the transmission case 82 is disposed higher than the upper end 10LU of the left seat 10L.

The shift actuator 16 of the ROV 1 according to the present preferred embodiment preferably includes the motor 16a that includes the motor shaft 16b1. The motor shaft 16b1 extends parallel or substantially parallel to the main shaft 83. Thus, the shift actuator 16 is made more compact than when the motor shaft 16b1 does not extend parallel or substantially parallel to the main shaft 83, e.g., when the motor shaft 16b1 is perpendicular or substantially perpendicular to the main shaft 83.

The shift actuator 16 of the ROV 1 according to the present preferred embodiment preferably includes the shift rod 91 including the shift actuator-side connector 91a connected to the drive shaft 16e via the operation lever 16f, and the shift mechanism-side connector 91d connected to the shift shaft 90 via the shift operation lever 90a. The shift shaft 90 may be used in both of MT and AMT vehicles. A component other than the shift shaft 90, such as the shift rod 91, may also be used in both of MT and AMT vehicles when dimensional and positional requirements are met. In such a case, for an ATM vehicle, the shift actuator-side connector 91a of the shift rod 91 may be connected to the drive shaft 16e of the shift actuator 16, and for an MT vehicle, the shift actuator-side connector 91a of the shift rod 91 may be connected to a link mechanism, such as a shift lever.

The clutch actuator 17 and the hydraulic clutch 100 of the ROV 1 according to the present preferred embodiment are connected to each other through the pipe 17c. This increases the flexibility of layout of the clutch actuator 17 on the body frame 20.

The reserve tank 55 of the ROV 1 according to the present preferred embodiment is fixed to the body frame 20 at a position higher than the clutch actuator 17. Thus, the reserve tank 55 is disposed in a space where other components are present at a relatively low density. This consequently facilitates the maintenance of the reserve tank 55.

At least a portion of the clutch actuator 17 of the ROV 1 according to the present preferred embodiment preferably overlaps with the engine case 69 as viewed along the axis of the crankshaft 67. Thus, the clutch actuator 17 and the engine case 69 are disposed more compactly in the direction perpendicular or substantially perpendicular to the axis of the crankshaft 67 than when the clutch actuator 17 and the engine case 69 do not overlap with each other at all as viewed along the axis of the crankshaft 67.

The first and second fixation members 42 and 43 of the ROV 1 according to the present preferred embodiment each preferably extend in the width direction of the vehicle, and are each fixed to the right and left main frames 22. Thus, the transmission case 82 is stably supported by the first fixation member 42, and the engine case 69 is stably supported by the second fixation member 43.

The transmission case 82 of the ROV 1 according to the present preferred embodiment is preferably disposed rearward relative to the steering wheel 2. The engine case 69 is disposed rearward relative to the left seat 10L. Thus, the transmission case 82, which is comparatively small, is disposed in a relatively small forward space, and the engine case 69, which is comparatively large, is disposed in a relatively large rearward space. Consequently, the space in the vehicle is utilized effectively.

The transmission 80 according to the present preferred embodiment is preferably an AMT, so that the driver operates the paddle shifter 21 to drive the motor 16a of the shift actuator 16 and thus the motor 16a enables shifting of the gears of the transmission 80. The transmission 80 is, however, not limited to an AMT. The transmission 80 may alternatively be an automatic transmission, so that the gears of the transmission are automatically shifted by a motor in accordance with a traveling state of the vehicle and irrespective of intention of the driver.

Although the transmission case 82 is preferably disposed in front of the crankcase 66 in the present preferred embodiment, the transmission case 82 is not limited to such a location. The transmission case 82 may alternatively be disposed behind the crankcase 66 or laterally (i.e., rightward or leftward) of the crankcase 66. The transmission case 82 is, however, preferably disposed in front of or behind the crankcase 66 with the aim of ensuring space in the width direction of the vehicle and increasing layout flexibility.

In the present preferred embodiment, the clutch actuator 17 is preferably supported by the bracket 41 on the second section 40Y of the auxiliary frame 40L, and is connected to the clutch 100 inside the transmission case 82 through the pipe 17c. However, the clutch actuator 17 is not limited to such an arrangement. The clutch actuator 17 may be directly fixed to the transmission case 82, similarly to the shift actuator 16.

Although the shift actuator 16 is preferably disposed on a forward portion of the transmission case 82 in the present preferred embodiment, the shift actuator 16 is not limited to such a location. The shift actuator 16 may alternatively be disposed on an upward, rightward, or leftward portion of the transmission case 82.

Although the engine case 69 preferably includes the crankcase 66 and the cylinder body 64 in the present preferred embodiment, the engine case 69 is not limited to such an arrangement. For example, the engine case 69 include the crankcase 66 but not the cylinder body 64.

The terms and expressions that have been employed are used as terms of description and not of limitation, and there is no intention, in the use of such terms and expressions, of excluding any equivalents of the features shown and described or portions thereof, but it is recognized that various modifications are possible within the scope of the present invention claimed. While the present invention may be embodied in many different forms, a number of preferred embodiments are described herein with the understanding that the present disclosure is to be considered as providing examples of the principles of the invention and that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a body frame;
   an engine including:
     an engine case attached to the body frame; and
     a crankshaft disposed inside and supported by the engine case;
   a transmission including:
     a main shaft provided with a plurality of first gears including a first movable gear that is axially movable, the main shaft being rotatable by a driving force from the crankshaft;
     a drive shaft provided with a plurality of second gears including a second movable gear that is axially movable, the second gears intermeshing with the first gears; and
     a shift drum in engagement with a shift fork that is in engagement with the first and second gears;
   a transmission case spaced apart from the engine case and housing the transmission; and
   a shift actuator connected to the shift drum and being rotatable with the shift drum; wherein
   at least a portion of the transmission case overlaps with the engine case when viewed along an axis of the crankshaft; and
   the shift actuator is fixed to and located on the transmission case.

2. The vehicle according to claim 1, wherein at least a portion of the shift actuator overlaps with the engine case when viewed along the axis of the crankshaft.

3. The vehicle according to claim 1, wherein the crankshaft extends in a front-rear direction of the vehicle.

4. The vehicle according to claim 1, further comprising a first seat on which a driver sits, wherein the first seat is supported by the body frame, and the engine case is disposed rearward of the first seat.

5. The vehicle according to claim 4, wherein the shift actuator is disposed lower than an upper end of the first seat.

6. The vehicle according to claim 1, further comprising a clutch inside the transmission case, wherein the clutch is disposed closer to the engine than the shift drum is to the engine.

7. The vehicle according to claim 6, wherein at least a portion of the first gear of the main shaft is disposed between the shift actuator and the clutch along an axis of the main shaft.

8. The vehicle according to claim 1, wherein the shift actuator is disposed lower than an upper end of the engine.

9. The vehicle according to claim 1, wherein the shift actuator includes an electric motor that includes a motor shaft, and the motor shaft is parallel or substantially parallel to the main shaft.

10. The vehicle according to claim 1, wherein the shift actuator includes an output shaft that outputs a driving force;
    the transmission includes an input shaft connected to the shift drum; and
    the vehicle further comprises a shift rod including:
      a first connector connected to the output shaft; and
      a second connector connected to the input shaft.

11. A vehicle comprising:
    a body frame;
    an engine including:
      an engine case attached to the body frame; and
      a crankshaft disposed inside and supported by the engine case;
    a transmission including:
      a main shaft provided with a plurality of first gears including a first movable gear that is axially movable, the main shaft being rotatable by a driving force from the crankshaft;

a drive shaft provided with a plurality of second gears including a second movable gear that is axially movable, the second gears intermeshing with the first gears; and a shift drum in engagement with a shift fork that is in engagement with the first and second gears;

a transmission case spaced apart from the engine case and housing the transmission; and a shift actuator connected to the shift drum and being rotatable with the shift drum; wherein at least a portion of the transmission case overlaps with the engine case when viewed along an axis of the crankshaft;

the shift actuator is fixed to the transmission case; and the transmission case is disposed forward of the engine case.

12. The vehicle according to claim 11, wherein the body frame includes:

a first subframe extending in the front-rear direction of the vehicle;

a second subframe disposed rightward of the first subframe, and extending in the front-rear direction of the vehicle;

a first fixation member fixed to the first subframe and the second subframe, and extending in a width direction of the vehicle; and a second fixation member disposed rearward of the first fixation member, fixed to the first subframe and the second subframe, and extending in the width direction of the vehicle; wherein the transmission case is supported by the first fixation member; and the engine case is supported by the second fixation member.

13. The vehicle according to claim 12, further comprising:

a first seat on which a driver sits, the first seat being supported by the body frame; and a steering wheel disposed forward of a rear end of the first seat and that is operated by the driver; wherein the first fixation member is disposed rearward of the steering wheel; and the second fixation member is disposed rearward of the first seat.

14. A vehicle comprising:

a body frame;

an engine including:
  an engine case attached to the body frame; and
  a crankshaft disposed inside and supported by the engine case;

a transmission including:
  a main shaft provided with a plurality of first gears including a first movable gear that is axially movable, the main shaft being rotatable by a driving force from the crankshaft;
  a drive shaft provided with a plurality of second gears including a second movable gear that is axially movable, the second gears intermeshing with the first gears; and
  a shift drum in engagement with a shift fork that is in engagement with the first and second gears;

a transmission case spaced apart from the engine case and housing the transmission;

a shift actuator connected to the shift drum and being rotatable with the shift drum;

a first seat on which a driver sits; and a second seat disposed rightward of the first seat; wherein at least a portion of the transmission case overlaps with the engine case when viewed along an axis of the crankshaft;

the shift actuator is fixed to the transmission case;

the first seat is supported by the body frame;

the engine case is disposed rearward of the first seat; and at least a portion of the transmission case is disposed between the first seat and the second seat in a width direction of the vehicle.

15. The vehicle according to claim 14, further comprising a shift operating element that is operated by the driver and transmits a signal to the shift actuator in response to an operation performed by the driver; wherein the transmission case is disposed lower than the shift operating element.

16. A vehicle comprising:

a body frame;

an engine including:
  an engine case attached to the body frame; and
  a crankshaft disposed inside and supported by the engine case;

a transmission including:
  a main shaft provided with a plurality of first gears including a first movable gear that is axially movable, the main shaft being rotatable by a driving force from the crankshaft;
  a drive shaft provided with a plurality of second gears including a second movable gear that is axially movable, the second gears intermeshing with the first gears; and
  a shift drum in engagement with a shift fork that is in engagement with the first and second gears;

a transmission case spaced apart from the engine case and housing the transmission;

a shift actuator connected to the shift drum and being rotatable with the shift drum;

a hydraulic clutch;

a hydraulic clutch actuator fixed to the body frame, the clutch actuator engaging and disengaging the hydraulic clutch; and a pipe connected to the clutch actuator and the hydraulic clutch; wherein at least a portion of the transmission case overlaps with the engine case when viewed along an axis of the crankshaft; and the shift actuator is fixed to the transmission case.

17. The vehicle according to claim 16, further comprising a reserve tank connected to the clutch actuator, wherein the reserve tank supplies hydraulic oil to the clutch actuator, and the reserve tank is fixed to the body frame at a position higher than the clutch actuator.

18. The vehicle according to claim 16, wherein at least a portion of the clutch actuator overlaps with the engine case when viewed along the axis of the crankshaft.

* * * * *